Patented June 19, 1945

2,378,597

UNITED STATES PATENT OFFICE 2,378,597

PARASITICIDAL PREPARATIONS

William P. ter Horst, Pompton Plains, N. J., assignor to United States Rubber Company, New York, N. Y., a corporation of New Jersey No Drawing. Application May 6, 1943,
Serial No. 485,895

3 Claims. (Cl. 167—30)

This invention relates to new and useful improvements in parasiticidal preparations, more particularly to germicides, that is, fungicides and bactericides. The invention further relates to methods of protecting organic material subject to attack by microorganisms, as in the immunizing of seed, and the mildewproofing of fabrics and other material.

I have found that 2,3,4,4,5,6-hexachloro-2,5-cyclohexadienone is an effective germicide. The structure of the compound may be represented as follows:

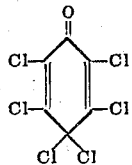

The compound and method of preparation are described by Benedict and Schmidt in "Monatshefte fur Chemie," vol. 4, page 609.

The 2, 3, 4, 4, 5, 6-hexachloro-2,5 - cyclohexadienone may be used as a seed protectant and to protect plants or soil from organisms harmful to seeds and plants. It may also be applied to prevent or retard fungus growth and the formation of, for example, mildew on rope, wood, fur, hair, feathers, cotton, wool, leather, rubber, rubberized or synthetic resin-coated fabrics, and the like. The 2,3,4,4,5,6-hexachloro-2,5-cyclohexadienone may be applied as dust or sprays or in solution in a suitable solvent. It may be applied diluted or undiluted, or mixed with carrier, or other fungicides, germicides or insecticides, fertilizers, hormones, buffering or safening agents.

The following examples are given to illustrate the invention:

Example I

Pea seed, variety Perfection, were tumbled with various amounts of 2,3,4,4,5,6-hexachloro-2,5-cyclohexadienone in dust form, as shown in the table below. The seeds were then planted in soil known to be infested with a number of organisms, including *Pythium ultimum*. The effectiveness of the fungicide was determined by comparing the number of treated seeds which germinated and developed into healthy plants with an equal number of untreated seeds planted under the same conditions. The results were as follows:

| Percent 2,3,4,4,5,6-hexachloro-2,5-cyclohexadienone based on seed weight | Percentage seed germination after 10 days | |
|---|---|---|
| | Treated | Untreated |
| .5 | 74 | 18 |
| .25 | 83 | 0 |
| .125 | 67 | 5 |
| .062 | 31 | 5 |

The seed and seedlings which were untreated were observed to be infested with *Pythium ultimum* which had caused seed and seedling rot, whereas those which were treated with 2,3,4,4,5,6-hexachloro-2,5-cyclohexadienone were free from this disease.

Example II

In this case fuzzy cotton seed, variety Stoneville 2b, highly infested with cotton anthracnose, were treated with dosages of 2,3,4,4,5,6-hexachloro-2,5-cyclohexadienone of 1 ounce and 3 ounces per bushel respectively, and planted in greenhouse soil under conditions favorable for anthracnose development. Untreated seeds were also planted as controls. Germination counts made ten days after planting showed 86% germination of the seed treated with 1 oz. of the chemical per bushel and 91% germination of the seed treated with 3 ozs. of the chemical per bushel, whereas the two controls showed 55% and 56% germination respectively.

Example III

This case illustrates the effectiveness of 2,3,4,4,5,6-hexachloro-2,5-cyclohexadienone as a bactericide. 5% by weight of 2,3,4,4,5,6-hexachloro-2,5-cyclohexadienone was suspended in water which contained 2% of Emulphor-EL (believed to be reaction product of fatty acid or fatty acid ester with ethylene oxide) as a dispersing agent. A section of potato was immersed in this suspension and allowed to stand at room temperature. No growth of naturally occurring bacteria was observed after thirty days. On the other hand, a section of potato treated in a similar manner with a 2% solution of Emulphor-EL in water, which solution did not contain a germicide, became heavily overgrown with naturally occurring bacteria within the same period of time.

Having thus described my invention, what I claim and desire to protect by Letters Patent is:

1. The method of protecting seeds, plants and soil against attack by fungi which comprises treating said material with 2,3,4,4,5,6-hexachloro-2,5-cyclohexadienone.

2. The method of immunizing seed against attack by fungi which comprises treating said seed with 2,3,4,4,5,6-hexachloro-2,5-cyclohexadienone.

3. The method of controlling mildew on organic material which comprises treating said organic material with 2,3,4,4,5,6-hexachloro-2,5-cyclohexadienone.

WILLIAM P. TER HORST.